United States Patent [19]

Weiner

[11] 3,989,954

[45] Nov. 2, 1976

[54] ELECTRICAL CIRCUIT FOR SWINGABLE HEADLIGHTS OF A MOTOR VEHICLE

[75] Inventor: Hans Weiner, Muhlacker, Germany

[73] Assignee: Porsche Aktiengesellschaft, Germany

[22] Filed: Oct. 16, 1975

[21] Appl. No.: 623,050

[30] Foreign Application Priority Data

Oct. 16, 1974 Germany.............................. 2449155

[52] U.S. Cl............................................. 307/10 LS
[51] Int. Cl.² ........................................... H02G 3/00
[58] Field of Search ..................... 307/10 LS, 10 R; 315/82, 77; 317/137, 123; 318/265, 266, 466, 467, 626

[56] References Cited
UNITED STATES PATENTS 2,522,264   9/1950   Haase .............................. 318/265 X Primary Examiner—Herman Hohauser
Attorney, Agent, or Firm—Craig & Antonelli

[57] ABSTRACT

Electrical circuit for swingable headlights of a motor vehicle including an electric motor for positioning the headlights and a multi-step switch for initiating the movements of the motor for positioning the headlights. The circuit also includes a contact-disk device coupled to the electric motor for controlling the end positions of the headlights, and first and second relays connected to the multi-step switch. The multi-step switch is provided with at least two step positions whereby the second relay is energized in dependence upon at least one of the step positions of the multi-step switch and by a voltage drop, the motor being driven in response to the energization of the second relay.

10 Claims, 1 Drawing Figure

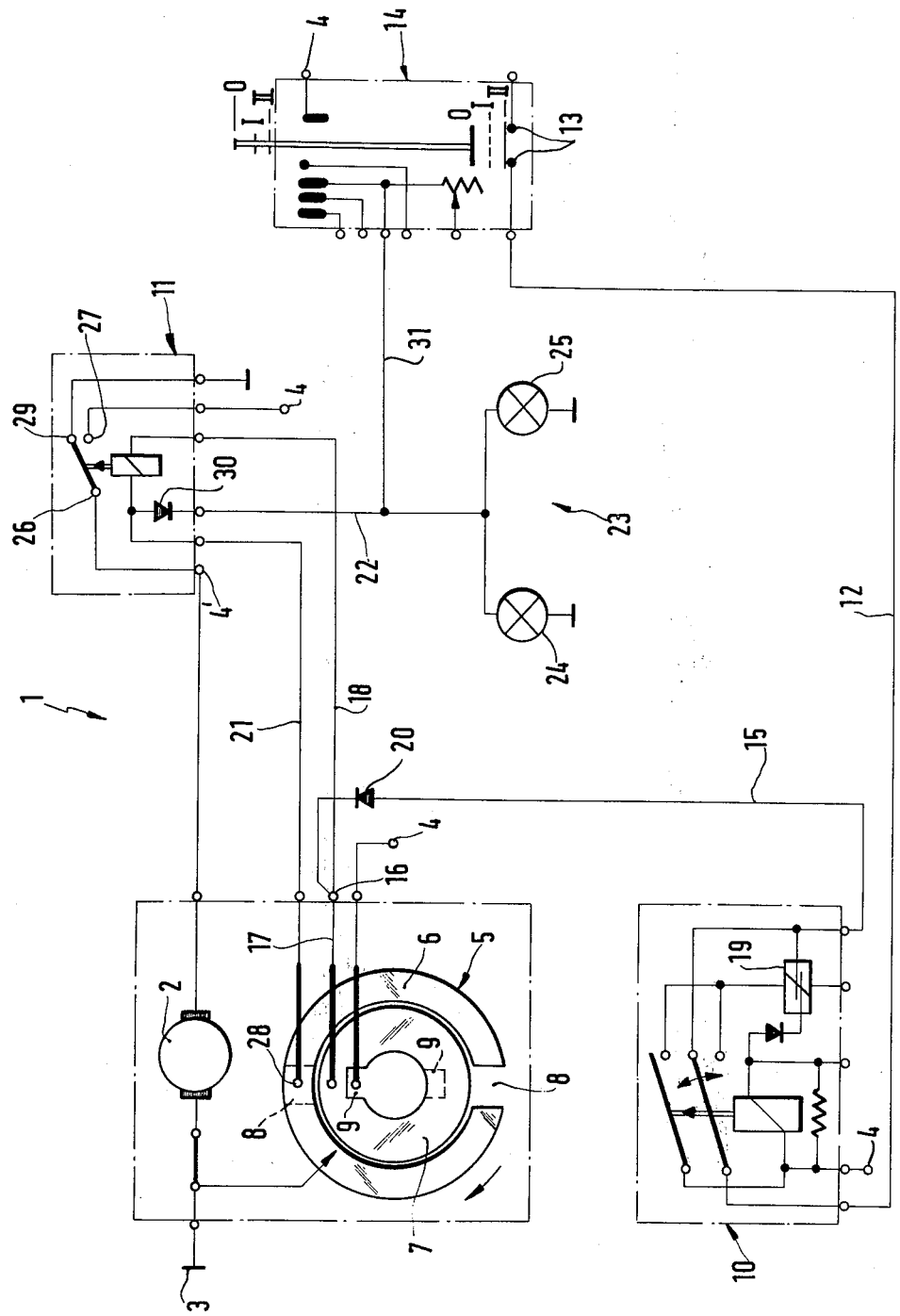

ELECTRICAL CIRCUIT FOR SWINGABLE HEADLIGHTS OF A MOTOR VEHICLE

The present invention relates to an electrical circuit for swingable headlights of a motor vehicle including an electric motor and a multi-step switch with which the movement of the headlights is initiated.

With known circuits of the aforementioned types for swinging or pivoting the headlights of a motor vehicle from, for example, an inward inoperative rest position to an outward operative position, additional contacts are provided at the switch with which the operation of the headlights is effected. This switch may be used, in contrast to conventional switches, for example, with stationary headlights.

It is therefore an object of the present invention to provide an electrical circuit for a swingable headlight with which, on the basis of its construction, an expensive switch is avoided.

According to the present invention, there is provided an electrical circuit wherein the electric motor for swinging the headlights is provided with a contact-disk device for controlling its end positions and which is connected to a first relay and a second relay. The relays are connected to a switch provided with two contact steps whereby the second relay is energized or deenergized depending on the position of the switch and by means of a voltage drop. It is advantageous that the voltage drop be produced by an electrical load device such as at least one indicating light. The contact-disk device is provided with two contact tracks with gaps for determining the end positions of the headlights with the contact-disk device being mechanically coupled to the shaft of the electric motor. A diode is arranged between the junction of the first relay and the contact-disk device and the second relay, and in addition, a diode is arranged between the load device and the second relay.

The major advantages obtained with the present invention are that by employing the present circuit, an inexpensive switch may be used and the contact-disk device assures a safe operation of the motor driving the headlight during the swinging phase as well as for the positioning of its end positions.

These and other objects, features and advantages of the present invention will become more apparent from the following description when taken in connection with the accompanying drawing which shows, for purposes of illustration only, one embodiment in accordance with the present invention.

The single FIGURE illustrates an electrical circuit for swingable headlights of motor vehicles in accordance with the present invention.

As shown in the FIGURE, there is provided an electrical circuit 1 including an electric motor 2 for driving the swingable headlights, not shown, to the end positions (rest position and operating position). The electric motor 2 is grounded at 3 and is supplied by a current carrying terminal 4' which is connected to the positive pole of the power supply through relay 11. A contact-disk device 5 is connected with the electric motor and is mechanically coupled to the shaft of the electric motor 2, not shown. The contact-disk device 5 is provided with an outer ring-track 6 and an inner ring-track 7. Gaps 8 and 9 representing nonconductive portions are provided on the ring-tracks 6, 7.

A first relay 10 as well as a second relay 11 is connected to the contact-disk device 5. The first relay 10 with which the main lighting of the motor vehicle is operated, is connected through a line 12 with contacts 13 of a two-step switch 14. An electrical line 15 leads from relay 10 through diode 20 to a terminal 16 and from there through lines 17 and 18 to the inner ring-track 7 and the relay 11, respectively. Furthermore, an additional switching relay 19 is connected to relay 10 so that, during switch-on of the light installation, the dim light is always connected.

The second relay 11 which serves to control the electric motor for the headlights is connected through a line 21 to the outer ring-track 6. Further, relay 11 is connected by line 22 to a load device 23 which, for example, may be constructed as an indicating light assembly having two lamps 24, 25. A diode 30 is arranged in line 22 between relay 11 and load device 23. Further, line 22 is connected to the switch 14 via line 31.

If swinging movement of the headlight, for example, drive-out to an operative position, is desired, the switch 14 is operated from step 0 into step II. By this, contacts 13 are closed whereby a positive signal arrives at the first relay 10 through line 12. The dim light is cut-in in the first relay 10, for example, by the switching relay 19 and, thereafter, the positive signal arrives, on the one hand, at the inner ring-track 7 and on the other, at the second relay 11, that is, at the positive side thereof. The negative side of the relay 11 is connected to the grounded outer ring-track 6 through line 21.

Relay 11 is therefore energized and contacts 26 and 27 are closed causing the electric motor 2 to rotate. The electric motor 2 rotates until the gap 8 of the outer ring-track 6 reaches the contact 28 of line 21. Relay 11 then again returns to its starting (de-energized) position. Since equal voltage exists at the contacts of relay 11 as at the side of the electric motor, a short-circuit connection ensues and the electric motor 2 is brought to a halt. The headlight is then in the driven-out or swung out operative position.

If the headlights are to be driven in, switch 14 is operated out of step II through step I, which does not influence the headlight motor control, into step 0. For this position, the switch 14 is disconnected from all light circuit loads including the connection provided by line 31. Now, through a voltage drop effected by load device 23, a negative signal arrives at the second relay 11 through diode 30.

Since the inner contact track 7 of the contact-disk device 5 is, in the driven-out position of the headlights, and is connected to the current carrying terminal 4 (battery positive) the relay 11 is again energized via lines 17, 18. The electric motor 2 rotates until the gap 9 of the inner relay track 7 interrupts the rotation of the electric motor. The electric motor 2 is disconnected and the headlights are then in the driven-in position.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. Electrical circuit for swingable headlights of a motor vehicle comprising an electric motor for positioning the headlights and a multi-step switch for initiating the movements of the motor for positioning the headlights, contact-disk means coupled to the electric motor for controlling the end positions of the headlights, first relay means and second relay means being connected to the multi-step switch, the multi-step switch being provided with at least two step positions whereby the second relay means is energized in dependence upon at least one of the step positions of the multi-step switch and by means providing a voltage drop, the motor being driven in response to the energization of the second relay means.

2. Electrical circuit according to claim 1, whereby the means for providing a voltage drop includes at least one electrical load device.

3. Electrical circuit according to claim 2, wherein the electrical load device includes a pair of indicating lights.

4. Electrical circuit according to claim 2, wherein the contact-disk means includes two ring-tracks, each of said tracks having a gap therein for delimiting the end positions of the headlights.

5. Electrical circuit according to claim 4, wherein the electric motor is provided with a shaft and the contact-disk means is connected with the shaft of the electric motor.

6. Electrical circuit according to claim 1, further comprising a diode arranged at the junction between the first relay and the contact-disk means and the second relay means.

7. Electrical circuit according to claim 1, further comprising a diode arranged between the means for producing a voltage drop and the second relay means.

8. Electrical circuit according to claim 2, further comprising a diode arranged between the electrical load device and the second relay means.

9. Electrical circuit according to claim 6, wherein in one position of the multi-step switch, the second relay means is energized via a path including the multi-step switch through the first relay, the diode, the second relay means, and the contact-disk means, the second relay means in the energized position providing an energizing path to the electric motor for positioning the headlights, the contact-disk means rotating in accordance with the rotation of the electrical motor and controlling the de-energization of the second relay means upon reaching a predetermined position thereof.

10. Electrical circuit according to claim 7, wherein the second relay means is energized in a second position of the multi-step switch via a path including the contact-disk means, the second relay, the diode and the electrical load device, the second relay in the energized position providing an energizing path to the electric motor for positioning the headlights, the contact-disk means being rotatable in accordance with the rotation of the electric motor and causing de-energization of the second relay at a predetermined rotational position thereof.

* * * * *